Aug. 4, 1925.
1,548,508
T. G. BROWN ET AL
TRANSMISSION AND BRAKE LINING
Filed Jan. 23, 1925
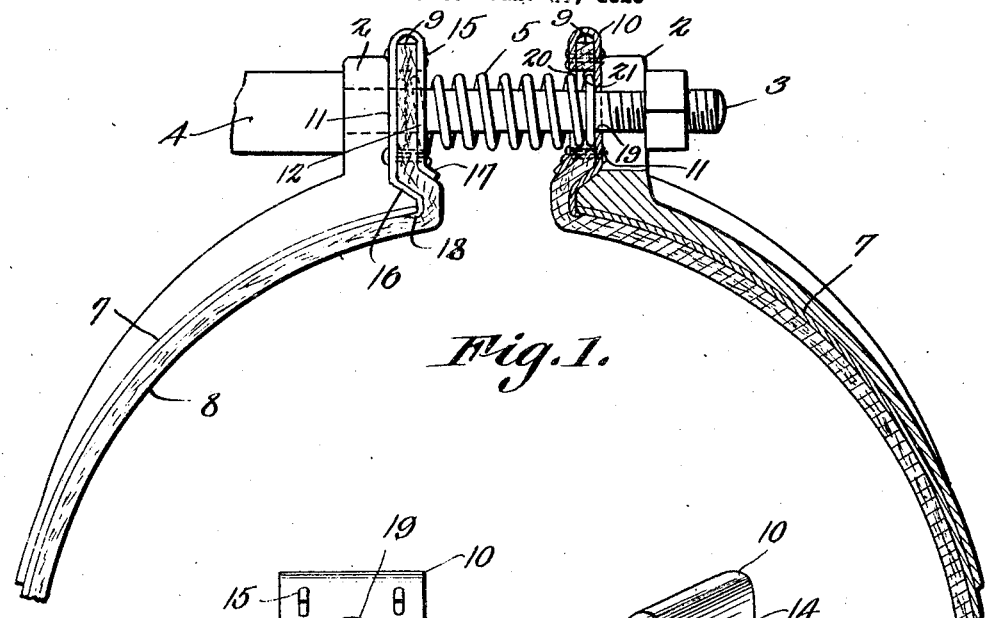
Fig. 1.
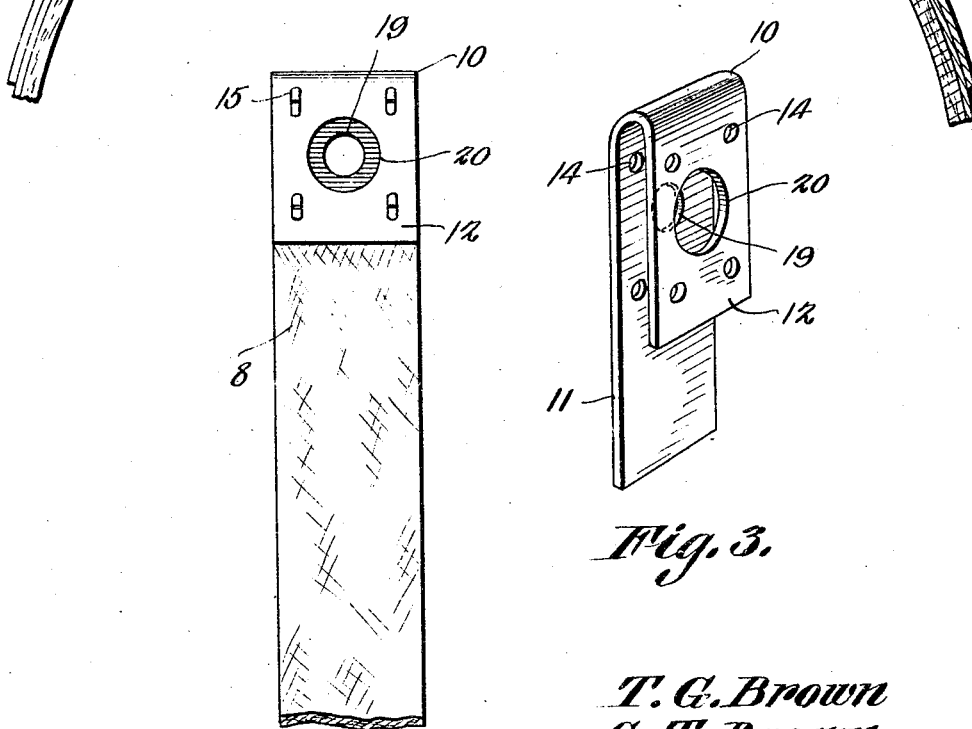
Fig. 2.
Fig. 3.
T. G. Brown
G. T. Brown
Inventors Patented Aug. 4, 1925.

1,548,508

UNITED STATES PATENT OFFICE.

THOMAS G. BROWN AND GEORGE T. BROWN, OF WILKES-BARRE, PENNSYLVANIA, ASSIGNORS TO TOM BROWN COMPANY, OF WILKES-BARRE, PENNSYLVANIA.

TRANSMISSION AND BRAKE LINING.

Application filed January 23, 1925. Serial No. 4,282.

*To all whom it may concern:*

Be it known that we, THOMAS G. BROWN and GEORGE T. BROWN, citizens of the United States, residing at Wilkes-Barre, in the county of Luzerne and State of Pennsylvania, have invented a new and useful Transmission and Brake Lining, of which the following is a specification.

This invention aims to provide a lining for the transmission band or the brake band of a Ford car, so constructed that when the lining is in place, it will not call for a shortening of the spring which is located between the lugs on the band, novel means being provided for preventing a cutting of the friction member of the lining.

It is within the province of the disclosure to improve generally and to enhance the utility of devices of that sort to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 shows in elevation, a device constructed in accordance with the invention, parts being in section; Figure 2 is a fragmental elevation showing a portion of the lining, parts being broken away; Figure 3 is a perspective view disclosing one of the caps.

The numeral 7 marks the transmisson or brake band of a Ford car, the band being provided with lugs 2 through which passes the stem 3 of a member 4 whereby the band is contracted, a compression spring 5 being disposed about the stem 3, between the lugs 2, to spread the band.

A friction facing 8 is disposed within the band 7, the ends 9 of the facing 8 extending outwardly along the inner surfaces of the lugs 2. The ends of the facing 8 are received in U-shaped metal caps 10, each cap including a long arm 11 and a short arm 12, the arms having openings 14 adapted to receive securing elements 15, such as rivets, whereby the caps 10 are held on the ends 9 of the facing 8. The end 16 of the long arm 11 of the cap 10 is shaped to conform to the lug 2 at the end of the band 1, and the end 17 of the arm 12 of the cap 10 is correspondingly shaped, the parts 16 and 17 assuming the shape shown by the compression of the brakes, after the member 8 has been placed within the band 7. In order to prevent the ends of part 7, and also the part 16 of the arm 11 of the cap 10, from wearing, cutting or otherwise injuring the friction facing 8, the element 16 is caused to terminate in a circumferentially extended flange 18 engaged beneath the end of the band 7.

Openings 19 are formed in the long or outer arm 11 of each cap 10, these openings being of such a diameter that the stem 3 of the member 4 will fit therein without much play. Openings 20 are fashioned in the short or inner arms 12 of the cap 10, and openings 21 are formed in the ends 9 of the friction facing 8, the openings 20 and 21 being of approximately the same diameter. The openings 20 and 21 are of such size that the ends of the spring 5 may be received therein. The result is that the ends of the spring 5 rest against the arms 11 of the caps 10, and it is unnecessary to shorten the spring 5, the spring retaining a maximum resiliency, because its length is unchanged.

Having thus described the invention, what is claimed is:—

1. A lining of the class described, comprising a friction facing having outstanding ends, and U-shaped caps on the ends of the facing, each cap comprising an inner arm and an outer arm, the arms and the ends of the facing having openings disposed in substantially concentric relation, the openings in the inner arm and in the end of the facing being of appreciably greater diameter than the opening in the outer arm of the cap.

2. The combination with a band of the class described, having lugs, a member extended through the lugs, and a compression spring on said member, between the lugs, of a lining within the band, the lining comprising a friction facing having outstanding ends cooperating with the lugs, and U-shaped caps on the ends of the facing, each cap comprising an inner arm and an outer arm, the outer arms having openings which are of sufficient size to receive said member, the ends of the facing and the inner arms having openings which are of appreciably larger diameter than the first-specified openings, to receive the spring, and to permit the spring to abut, at its ends, against the outer arms around the first-specified openings.

3. A device of the class described, comprising a band and a facing within the band, the facing having outstanding ends, and U-shaped caps receiving the ends of the facing, the caps comprising outer walls having flanges which extend circumferentially in opposite directions, between the ends of the band and the facing.

In testimony that we claim the foregoing as our own, we have hereto affixed our signatures.

THOMAS G. BROWN.
GEORGE T. BROWN.